(12) United States Patent
London et al.

(10) Patent No.: US 9,416,690 B2
(45) Date of Patent: Aug. 16, 2016

(54) REDUCED INERTIA VALVE STEM SEAL FLANGE

(75) Inventors: John A. London, Cornelia, GA (US); Patrick L. Scheib, Cornelia, GA (US)

(73) Assignee: FREUDENBERG-NOK GENERAL PARTNERSHIP, Plymouth, MI (US)

( * ) Notice: Subject to any disclaimer, the term of this patent is extended or adjusted under 35 U.S.C. 154(b) by 1968 days.

(21) Appl. No.: 12/512,367

(22) Filed: Jul. 30, 2009

(65) Prior Publication Data

US 2011/0024666 A1    Feb. 3, 2011

(51) Int. Cl.
| | | |
|---|---|---|
| F01L 3/00 | (2006.01) | |
| F01L 3/10 | (2006.01) | |
| F16K 31/44 | (2006.01) | |
| F02F 11/00 | (2006.01) | |
| F01L 3/08 | (2006.01) | |
| F16J 15/32 | (2016.01) | |

(52) U.S. Cl.
CPC ... F01L 3/08 (2013.01); F01L 3/10 (2013.01); F16J 15/3252 (2013.01)

(58) Field of Classification Search
CPC ........................................................ F01L 3/08
USPC ................. 251/337, 214; 123/188.6; 277/502
See application file for complete search history.

(56) References Cited

U.S. PATENT DOCUMENTS

| | | | |
|---|---|---|---|
| 3,554,180 A | | 1/1971 | Lesser |
| 3,554,562 A | | 1/1971 | Davis, Jr. |
| 4,717,178 A | * | 1/1988 | Daghe et al. ...................... 285/4 |
| 4,909,202 A | | 3/1990 | Binford et al. |
| 4,947,811 A | | 8/1990 | Binford |
| 5,174,256 A | * | 12/1992 | Binford ..................... 123/188.6 |
| 5,558,056 A | | 9/1996 | Sakata |
| 5,775,284 A | * | 7/1998 | Kirchner et al. ........... 123/188.6 |
| 6,848,671 B2 | * | 2/2005 | Hegemier et al. ............. 251/214 |
| 6,901,902 B1 | | 6/2005 | Butcher et al. |
| 7,316,386 B2 | * | 1/2008 | Leimer ......................... 251/337 |

FOREIGN PATENT DOCUMENTS

| | | |
|---|---|---|
| DE | 1750200 A1 | 2/1971 |
| WO | WO 2004109067 A1 * | 12/2004 |

* cited by examiner

*Primary Examiner* — Kevin Murphy
*Assistant Examiner* — Hailey K Do
(74) *Attorney, Agent, or Firm* — Daniel J. Sepanik, Esq.; Harness, Dickey & Pierce, P.L.C.

(57) ABSTRACT

A valve stem seal including a radially outwardly extending flange that includes one or more circumferential grooves to allow the flange to flex and lay flat against a support surface and protect the flange from fatigue.

12 Claims, 3 Drawing Sheets

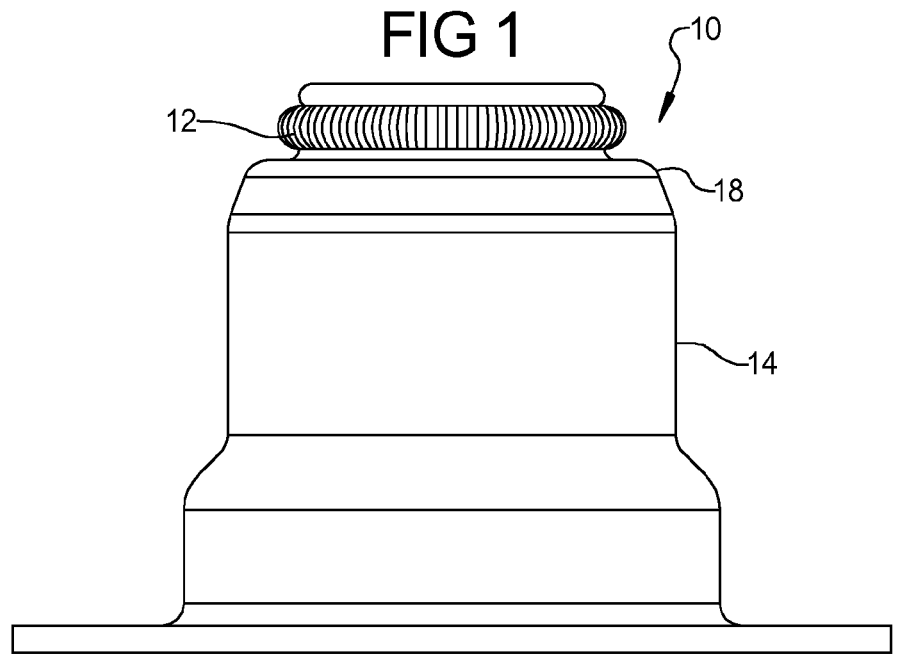
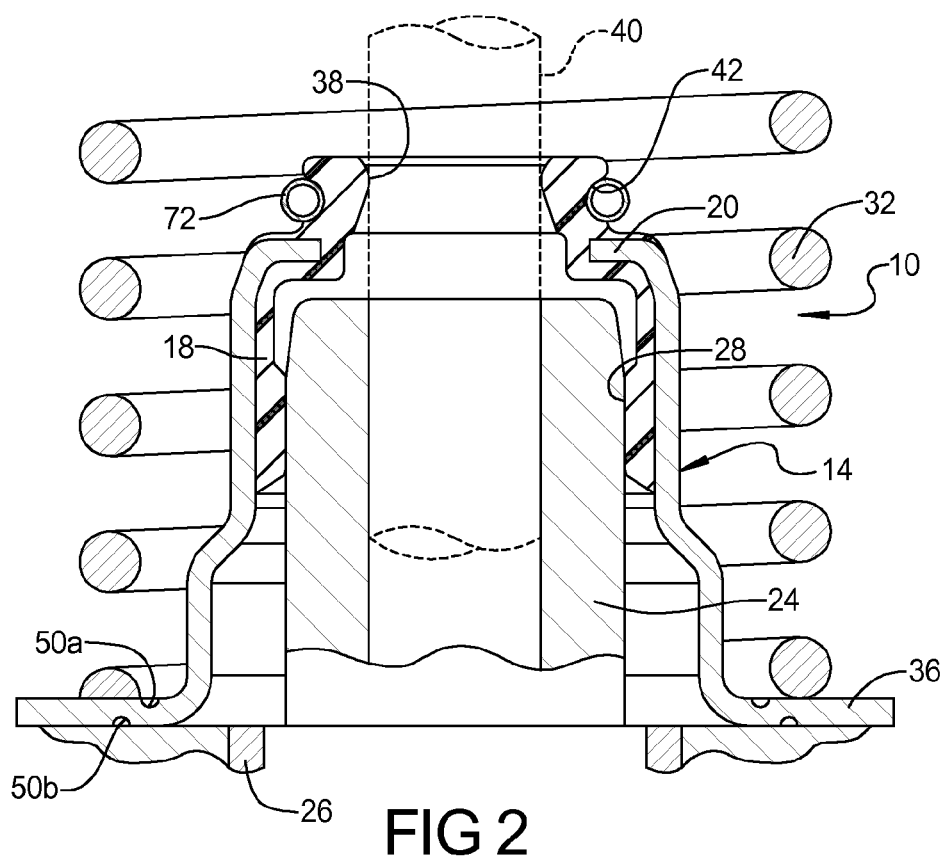

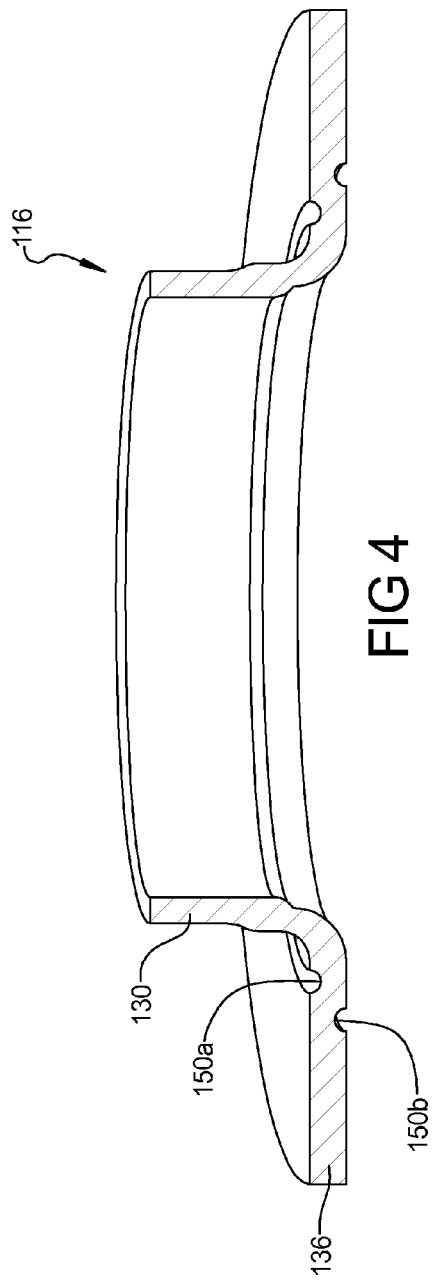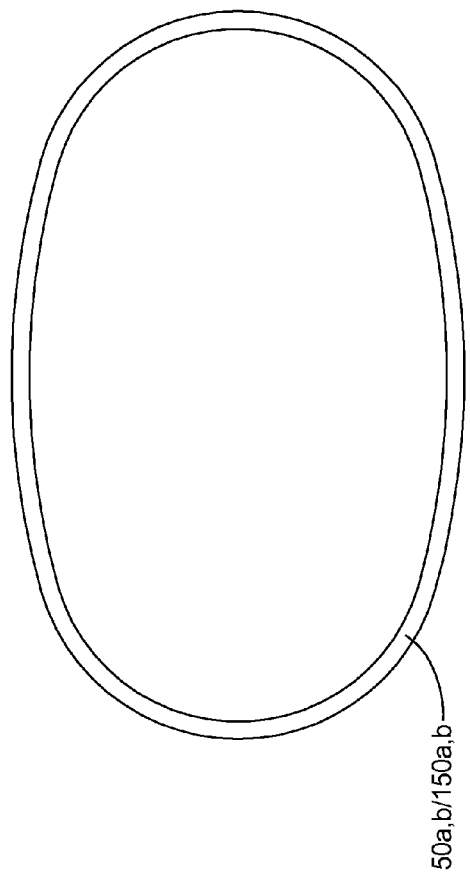

REDUCED INERTIA VALVE STEM SEAL FLANGE

FIELD

The present disclosure relates to valve stem seals, and more particularly to a valve stem seal or valve stem seal assembly with integrated spring seat preferably for use in an internal combustion engine, but applicable to other valve stem sealing applications.

BACKGROUND

This section provides background information related to the present disclosure which is not necessarily prior art.

The primary function of a valve stem seal in an internal combustion engine, for example, is to allow adequate lubrication at the valve stem/valve guide interface while minimizing internal oil consumption. Valve stem seals of this general type are known in the prior art, as shown in U.S. Pat. Nos. 5,558,056; 4,947,811; 4,909,202; 3,554,562; and 3,554,180, for example. (In addition, a two-piece valve stem seal of this general type is shown in U.S. Pat. Nos. 6,901,902 and 5,775,284, which are assigned to the same assignee as the present application.)

A valve stem seal assembly generally includes a rigid shell structure and a seal body, with the assembly having a generally hollow interior adapted to receive a valve stem guide. Typically the shell structure supports the seal body, which surrounds the valve stem in order to essentially "meter" the provision of oil for lubricating the valve guide's inner diameter and the outer diameter of the valve stem. At the same time, however, the valve stem seal serves to minimize the amount of oil that can be drawn into the combustion chamber or pass to the engine's exhaust. If the rigid shell is not properly located in relation to the valve guide, the sealing element might not properly seat upon the valve stem thus causing non-uniform pressures at the valve stem and valve guide, undesirable wear patterns on the seal or valve stem and unpredictable lubrication of the valve stem and valve guide.

Some prior art valve stem seals have had histories of cracked flanges during vehicle operations due to valve train harmonics and the resulting internal stresses at the flange portion of the valve stem seal. Some of such prior art valve stem seals also have not had sufficiently flat flange portions, thus further increasing the likelihood of flange cracking. If the flange portion is not sufficiently flat, the valve stem seal is susceptible to fatigue loading by the valve spring as the valve opens and closes, flexing the flange.

The present disclosure provides a valve stem seal which will offer greater resistance to the cyclical forces exerted by the valve spring which causes the flange of a valve stem seal or valve stem seal assembly to crack.

SUMMARY

This section provides a general summary of the disclosure, and is not a comprehensive disclosure of its full scope or all of its features.

A valve stem seal or valve spring seal assembly with an integrated spring seat according to the present disclosure for use in a valve-containing device having a valve with a valve stem thereon includes a generally hollow cylindrical shell having a radially inwardly extending flange adjacent an axially outer end of the shell and a radially outwardly extending flange adjacent an axially inward end of the shell. One or more grooves are provided in the flange. The grooves permit the flange to flex and lay flat on the engine block to protect the valve stem seal from fatigue. (In the case of a two-piece valve stem seal, a generally hollow second cylindrical shell (so-called "lower" shell) is provided having a radially outwardly extending flange adjacent an axially outer end thereof and an engagement portion adjacent an axially inward end thereof. A portion of said first shell extends axially within an inner surface of the second shell, with the axially-extending engagement portion of the first shell grippingly engaging a portion of an outer surface of the first shell in an interference fit there between.)

In either a valve stem seal or a two-piece valve stem seal assembly a resilient sealing body is supported by the shell, said resilient sealing body having an opening there through for receiving the valve stem in sealing contact therewith when the valve stem seal or valve stem seal assembly is assembled into the engine or other valve-containing device.

Preferably, the improved valve stem seal or valve stem seal assembly includes a rigid cylindrical shell, preferably composed of a metal or metal-containing material. The resilient sealing body can be composed of rubber or other resilient elastomers and is preferably bonded directly to the preferred metal casing of the cylindrical shell. This allows the sealing body in many embodiments to remain stationary with the cylindrical shell thus reducing wear of the sealing body's seal lip and extending product life. Such bonded resilient seal body also allows for easier seal installation and removal, greater support of the sealing body's sealing lip and superior control of oil metering for lubrication of the valve stem.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a side view of a valve stem seal according to the principles of the present disclosure;

FIG. 2 is a cross-sectional view of the valve stem seal of FIG. 1, but illustrating the valve stem seal installed or assembled into an exemplary device, such as an internal combustion engine;

FIG. 4 is a perspective cross-sectional view of the lower shell of a two-piece valve stem seal assembly as shown in FIG. 3; and FIG. 5 is a schematic illustration of a groove pattern to prevent relative rotation in the event of fracturing of the flange.

Corresponding reference numerals indicate corresponding parts throughout the several views of the drawings.

DETAILED DESCRIPTION

Figure 3:
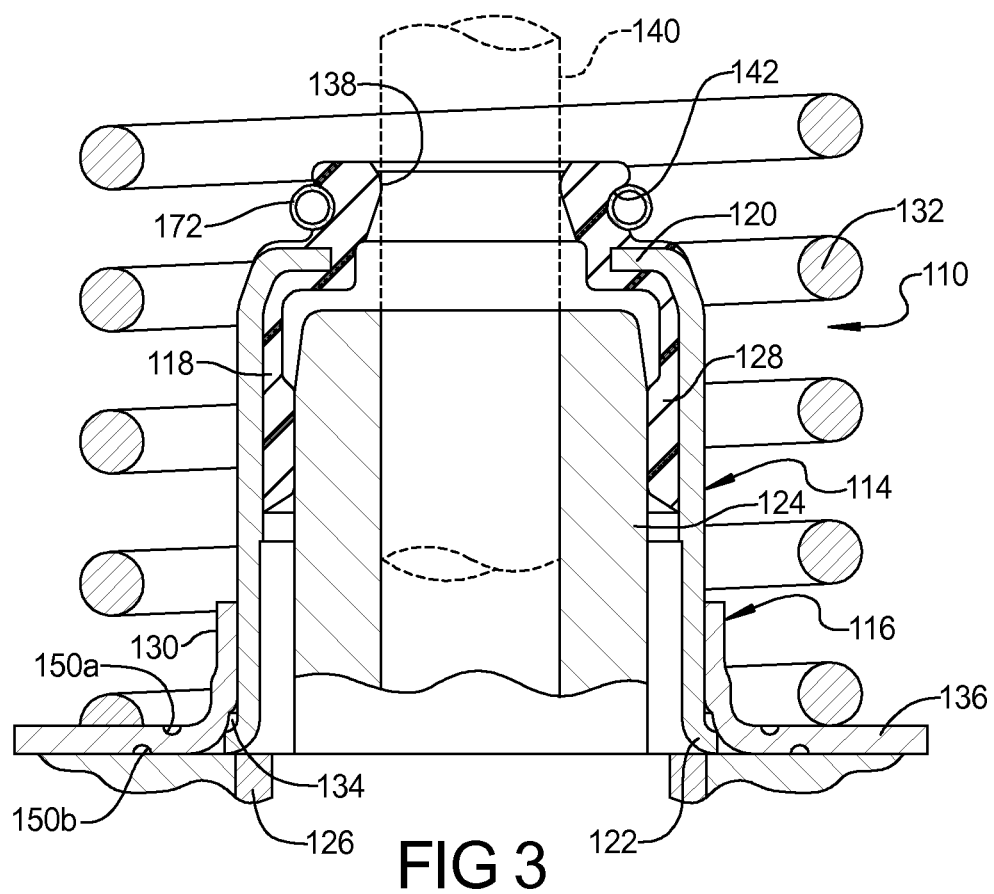
FIG. 3 is a cross-sectional view of a two-piece valve stem seal assembly illustrating the valve stem seal assembly installed or assembled into an exemplary device, such as an internal combustion engine.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

For purposes of example only, FIGS. 1 through 2 are primarily directed toward a valve stem seal for an internal combustion engine application. FIGS. 3 and 4 show an alternative two-piece valve stem seal assembly. It should be noted, as will become apparent to those skilled in the art from the following description and claims, the principles of the present disclosure are equally applicable to other devices having valves with valve stems thereon.

With reference to FIGS. 1 and 2, a valve stem seal 10 includes a generally rigid cylindrical shell 14, preferably made of a metal-containing material, but which may be made of ceramic or other relatively hard and rigid materials. Although the shell 14 is preferably generally hollow and cylindrical in shape, other shapes may be used depending on the needs of the specific application for the valve stem seal assembly.

The valve stem seal 10 also includes a resilient sealing member or body 18 that is preferably directly bonded to the rigid cylindrical shell 14. The resilient sealing body 18 is preferably made of rubber or a rubber-containing material but may alternately be composed of other resilient elastomers or plastic materials capable of seal in the given environment.

In the embodiments shown in FIGS. 1 and 2, the resilient sealing body 18 is preferably directly molded to the end wall 20 of the rigid cylindrical shell 14 and may be molded to the end wall 20 such that it completely surrounds the end wall 20. However, other variations may be used for connecting the sealing body 18 to the rigid cylindrical shell 14, such as by an interference fit, adhesives, epoxies or other known connections capable of creating a relatively fixed joint between the cylindrical shell 14 and the resilient sealing body 18. A rubber or other resilient elastomeric pad 28 (which can be integral with the sealing body 18) is also molded onto the interior wall of the rigid cylindrical shell 14 and is in contact with the valve guide 24 upon installation in an automotive cylinder head (or engine block assembly portion) 26.

The resilient sealing body 18 also preferably includes an annular sealing lip 38 at an "upper" or axially outer portion to seal with the valve stem 40 during engine operation. The resilient sealing body 18 also includes a concave groove 42 along an upper portion for receiving and retaining a spring member 72 (preferably a garter spring). The spring member 72 resiliently urges the resilient annular sealing lip 38 toward its contact with the valve stem 40 during engine operation. This spring member 72 and the annular sealing lip 38 function to control the amount of oil passing between the valve stem 40 and the valve stem seal assembly 10.

The rigid cylindrical shell 14 also includes a radially outwardly-extending flange or seat 36 adjacent its axially outer or "lower" end which protects the valve spring 32 from wearing against the cylinder head 26 during engine operation.

According to an aspect of the present disclosure, one or more grooves 50a, 50b are provided in the flange 36. By way of example, the grooves 50a, 50b can include one or more circumferential grooves 50a disposed on the upper surface of the flange 36 and/or one or more grooves 50b disposed on the lower surface of the flange 36. The grooves 50a, 50b can be radially spaced from one another or radially aligned. In the case of the flange 36 not being manufactured sufficiently flat, the grooves 50a, 50b permit the flange 36 to flex and lay flat on the engine block to protect the valve stem seal from fatigue. The grooves can have a depth of approximately ¼ to ½ material thickness of the flange 36 and can have a rounded, squared, triangular or other shaped cross section. The grooves 50a, 50b can be located on the inner half of the flange 36 to allow easier flange flexing.

Although the purpose of the grooves is to allow flex of the flange 36, complete and controlled fracture of the flange along the grooves 50a, 50b can be acceptable. Along these lines, the grooves 50a, 50b can be designed with the intent that if fracture does occur, the fracture occurs in a controlled manner along the grooves 50a, 50b. Accordingly, the pattern of the grooves 50a, 50b can be elliptical or other shape to prevent rotation between the flange 36 and the rigid shell 14 in the event of fracture, as shown in FIG. 5.

With reference to FIGS. 3 and 4, a valve stem seal assembly 110 can have a two-piece construction, including a first generally rigid cylindrical shell 114, preferably made of a metal-containing material, but which may be made of ceramic or other relatively hard and rigid materials. Although the first shell 114 is preferably generally hollow and cylindrical in shape, other shapes may be used depending on the needs of the specific application for the valve stem seal assembly.

The valve stem seal assembly 110 also includes a resilient sealing member or body 118 that is preferably directly bonded to the rigid cylindrical shell 114. The exterior surface of the first shell 114 engages the inner surface of a second generally rigid shell 116. The second shell 116 is also of a metal-containing material, but which may be made of ceramic or other relatively hard and rigid materials. Although the second shell 116, like the first shell 114, is preferably generally hollow and cylindrical in shape, other shapes may be used depending on the needs of the specific application for the valve stem seal assembly. The resilient sealing body 118 is preferably made of rubber or a rubber-containing material but may alternately be composed of other resilient elastomers or plastic materials capable of seal in the given environment.

In the embodiment shown in FIGS. 3 and 4, the cylindrical shell 114 can have an interference fit with the second cylindrical shell 116. However, other types of connection or bonding may be used, such as welding, direct forging, for example, any other type of bonding or connecting means available. The connection between the first and second cylindrical shells can take on the form of the connections disclosed in commonly assigned U.S. Pat. Nos. 6,901,902 and 5,775,284, which are herein incorporated by reference in their entirety. The rigid cylindrical shell 114 includes an inwardly extending end wall 120 and an outwardly projecting flange 122 at an inward or "lower" end thereof.

The resilient sealing body 118 is preferably directly molded to the end wall 120 of the rigid cylindrical shell 114 and may be molded to the end wall 120 such that it completely surrounds the end wall 120. However, other variations may be used for connecting the sealing body 118 to the rigid cylindrical shell 114, such as by an interference fit, adhesives, epoxies or other known connections capable of creating a relatively fixed joint between the cylindrical shell 114 and the resilient sealing body 118. A rubber or other resilient elastomeric pad 128 (which can be integral with the sealing body 118) is also molded onto the interior wall of the rigid cylindrical shell 114 and is in contact with the valve guide 124 upon installation in an automotive cylinder head (or engine block assembly portion) 126. The preferred interference fit between the first cylindrical shell 114 and the second cylindrical shell 116 creates a retaining force to urge the rubber pad 128 into constant contact with the valve guide assembly 124.

The resilient sealing body 118 also preferably includes an annular sealing lip 138 at an "upper" or axially outer portion to seal with the valve stem 140 during engine operation. The resilient sealing body 118 also includes a concave groove 142 along an upper portion for receiving and retaining a spring member 172 (preferably a garter spring). The spring member 172 resiliently urges the resilient annular sealing lip 138 toward its contact with the valve stem 140 during engine operation. This spring member 172 and the annular sealing lip 138 function to control the amount of oil passing between the valve stem 140 and the valve stem seal assembly 110.

A "vertical" or axially-extending wall 130 of the second cylindrical shell 116 eliminates, or at least substantially minimizes, the possibility of the sealing body 118 of the valve stem assembly 110 separating from the valve guide 124 during operation of the vehicle. The axially extending wall 130 of the second cylindrical shell 116 includes a radially inward step 134. The second cylindrical shell also includes a radially outwardly-extending flange or seat 136 adjacent its axially outer or "lower" end. The second shell 116 thus provides a barrier of protection which protects the valve spring 132 from wearing against the cylinder head 126 during engine operation.

The second cylindrical shell 116 is manufactured separately from the first cylindrical shell 114, thus making it possible to reduce the occurrence of internal stresses in the second cylindrical shell 116. This also allows the second cylindrical shell's flange 36 to have a flatness that can be more accurately controlled, which in turn will reduce the flange bending stress. According to a further aspect of the present disclosure, one or more grooves 150a, 150b are provided in the flange 136. By way of example, the grooves 150a, 150b can include on or more circumferential grooves 150a disposed on the upper surface of the flange 136 and/or one or more grooves 150b disposed on the lower surface of the flange 136. The grooves 150a, 150b can be radially spaced from one another or radially aligned. In the case of the flange not being manufactured sufficiently flat, the grooves 150a, 150b permit the flange 136 to flex and lay flat on the engine block to protect the valve stem seal from fatigue. The grooves 150a, 150b can have a depth of approximately ¼ to ½ the material thickness and can have a rounded, squared, triangular or other shaped cross section.

Although the purpose of the grooves is to allow flex of the flange 136, complete and controlled fracture of the flange along the grooves 150a, 150b can be acceptable. Along these lines, the grooves 150a, 150b can be designed with the intent that if fracture does occur, the fracture occurs in a controlled manner along the grooves 150a, 150b. Accordingly, the pattern of grooves 150a, 150b can be elliptical or other shape to prevent rotation between the flange 136 and the rigid shell 116 in the event of fracture, as shown in FIG. 5.

What is claimed is:

1. A valve stem seal including:
   a rigid cylindrical shell having an outwardly extending flange at a bottom end thereof;
   a resilient sealing body in contact with said rigid cylindrical shell, said resilient sealing body in constant contact with a valve stem; and
   said outwardly extending flange of said rigid cylindrical shell includes a first circumferential groove in an upper surface thereof and a second circumferential groove in a lower surface thereof, said first and second circumferential grooves spaced from a junction between said rigid cylindrical shell and said outwardly extending flange.

2. The valve stem seal of claim 1 wherein said rigid cylindrical shell is made of a metal material.

3. The valve stem seal of claim 1 wherein said resilient sealing body is made of a rubber material.

4. The valve stem seal of claim 1 further including an annular sealing lip at a top portion of said resilient sealing body.

5. The valve stem seal of claim 1 wherein said rigid cylindrical shell is made of an upper rigid cylindrical shell and a lower rigid cylindrical shell.

6. The valve stem seal of claim 5 wherein said resilient sealing body is bonded directly to the upper rigid cylindrical shell and said outwardly extending flange extends from said lower rigid cylindrical shell.

7. The valve stem seal of claim 1, wherein said first and second circumferential grooves have a depth of between $\frac{1}{4}$ to $\frac{1}{2}$ a thickness of said outwardly extending flange.

8. A valve stem seal including:
   a rigid cylindrical shell having an outwardly extending flange at a bottom end thereof;
   a resilient sealing body in contact with said rigid cylindrical shell, said resilient sealing body in constant contact with a valve stem; and
   said outwardly extending flange of said rigid cylindrical shell including means for fracturing of the outwardly extending flange from the rigid cylindrical shell;
   wherein said means for fracturing of the outwardly extending flange include grooves in said flange;
   wherein a pattern of said grooves are shaped to prevent relative rotation between the rigid cylindrical shell and the outwardly extending flange in the event of fracturing of the flange.

9. The valve stem seal of claim 8, wherein said grooves are elliptical in profile.

10. The valve stem seal of claim 8 wherein said rigid cylindrical shell is made of an upper rigid cylindrical shell and a lower rigid cylindrical shell.

11. The valve stem seal of claim 10 wherein said resilient sealing body is bonded directly to the upper rigid cylindrical shell and said outwardly extending flange extends from said lower rigid cylindrical shell.

12. A valve stem seal including:
   a rigid cylindrical shell having an outwardly extending flange at a bottom end thereof;
   a resilient sealing body in contact with said rigid cylindrical shell, said resilient sealing body in constant contact with a valve stem; and
   said outwardly extending flange of said rigid cylindrical shell including means for fracturing of the outwardly extending flange from the rigid cylindrical shell;
   wherein said means for fracturing of the outwardly extending flange include grooves in said flange;
   wherein a pattern of grooves are shaped to prevent axial motion between the rigid cylindrical shell and the outwardly extending flange in the event of fracturing of the flange.

* * * * *